March 28, 1939. T. A. P. MATTHEWS 2,152,265
SICKLE GUARD
Filed July 23, 1938
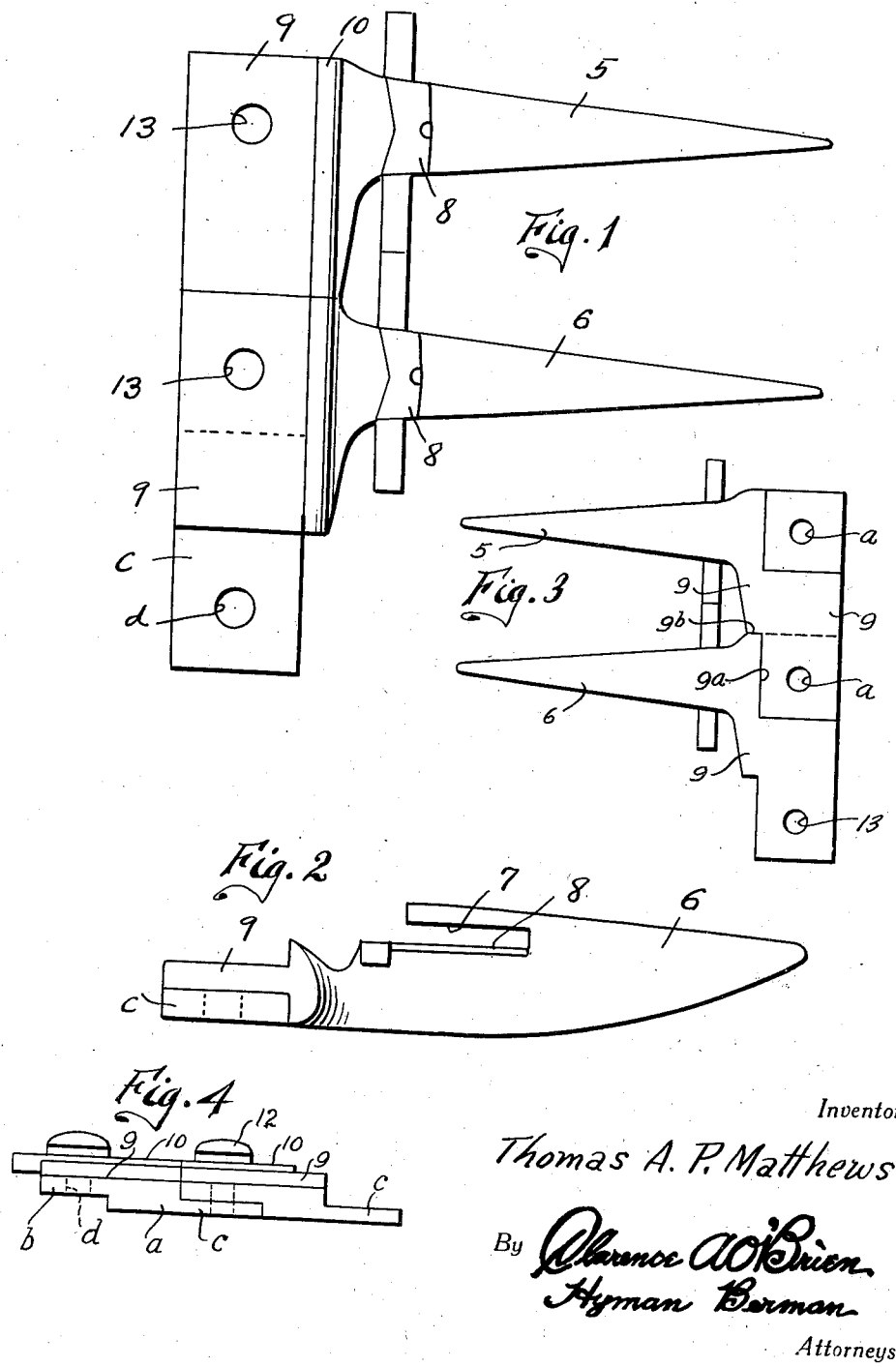
Inventor
Thomas A. P. Matthews
By Clarence A. O'Brien
Hyman Berman
Attorneys Patented Mar. 28, 1939

2,152,265

UNITED STATES PATENT OFFICE 2,152,265

SICKLE GUARD

Thomas A. P. Matthews, Newport, Tenn.

Application July 23, 1938, Serial No. 220,954

1 Claim. (Cl. 56—310)

This invention appertains to new and useful improvements in guards for sickles such as are used on mowing machines and various types of harvesters.

The principal object of the present invention is to provide a sickle guard constructed in such a manner as to overcome some of the defects which now occur in sickle guards due to unreinforced constructions.

Another important object of the invention is to provide a sickle guard wherein the guard fingers are attached in such a manner as to be firmly united against flimsiness which can be conveniently disconnected for the purpose of repair or replacement.

These and various other important objects and advantages of the invention will become apparent to the reader of the following specification.

In the drawing:

Figure 1 represents a top plan view of a pair of guard fingers in associated relation.

Figure 2 is a side elevational view.

Figure 3 is a bottom plan view.

Figure 4 is a rear elevational view.

Referring to the drawing wherein like numerals designate like parts, it can be seen in Figure 1 that numerals 5 and 6 represent a pair of guard fingers the upper portions of which are cut forwardly to provide the guideway 7 for the usual sickle bar (not shown). Numeral 8 represents the ledger plate for each of the fingers 5 and 6. Each finger of the guard assembly includes a head portion 9 which has the beading 10 disposed along its drop side the finger. Each of these heads 9 has one end portion extending substantially beyond one side of the corresponding finger, the same abutting in assembly the adjacent end of an adjoining finger head.

One end is reduced on its bottom side to provide the extension b, the same being undercut, while its opposite end is reduced on its top side to form the overcut portion c. It can now be seen that the undercut end portion b of one plate 11 can overlap the overcut end portion c of an adjoining head so that the openings d and 13 therein will register and through these registering openings can be disposed the securing bolt 12. Thus the fingers are firmly held together. The teeth thus formed define shoulders 9a at the inner ends thereof, which have the overcut portions c engaged against the same, the inner end portions of the heads 9 being cut inwardly to define shoulders 9b against which the inner ends of adjacent teeth can laterally abut.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a sickle guard, guard teeth, each of the guard teeth being provided with a laterally disposed plate at its blade adjacent end portion, each of said plates at one end provided with a recession on one side, the other side of the plate at its opposite end constructed to provide a reduced extension for disposition in the recession of the adjacent end of an adjoining plate, the other end portion of each plate being reduced transversely to provide a forward shoulder, each of the teeth having a laterally disposed portion at its blade adjacent end portion to abut the shoulder of the adjacent end of the adjoining plate.

THOMAS A. P. MATTHEWS.